(12) United States Patent
Watkins (10) Patent No.: US 9,961,133 B2
(45) Date of Patent: May 1, 2018

(54) METHOD AND APPARATUS FOR REMOTE APPLICATION MONITORING

(71) Applicant: The Johns Hopkins University, Baltimore, MD (US)

(72) Inventor: Lanier A. Watkins, Newark, DE (US)

(73) Assignee: The Johns Hopkins University, Baltimore, MD (US)

( * ) Notice: Subject to any disclaimer, the term of this patent is extended or adjusted under 35 U.S.C. 154(b) by 222 days.

(21) Appl. No.: 14/462,828

(22) Filed: Aug. 19, 2014

(65) Prior Publication Data

US 2015/0127698 A1  May 7, 2015

Related U.S. Application Data

(60) Provisional application No. 61/899,447, filed on Nov. 4, 2013, provisional application No. 61/985,131, filed on Apr. 28, 2014.

(51) Int. Cl.
| | | |
|---|---|---|
| *G06F 15/16* | (2006.01) | |
| *H04L 29/08* | (2006.01) | |
| *H04L 29/06* | (2006.01) | |
| *H04L 12/26* | (2006.01) | |

(52) U.S. Cl.
CPC ........... *H04L 67/10* (2013.01); *H04L 67/125* (2013.01); *H04L 69/28* (2013.01); *H04L 43/0852* (2013.01); *H04L 43/10* (2013.01)

(58) Field of Classification Search
CPC . H04L 69/28; H04L 12/2678; H04L 12/1657; H04L 43/10; H04L 43/0852
See application file for complete search history.

(56) References Cited

U.S. PATENT DOCUMENTS

| | | | |
|---|---|---|---|
| 7,945,955 B2 | 5/2011 | Katkar | |
| 8,166,544 B2 * | 4/2012 | Memon | ............... H04L 63/1416 709/224 |
| 8,321,941 B2 | 11/2012 | Tuvell et al. | |
| 8,590,045 B2 | 11/2013 | Niemela et al. | |
| 8,763,126 B2 | 6/2014 | Wang et al. | |
| 8,844,038 B2 | 9/2014 | Niemela | |
| 9,485,272 B1 | 11/2016 | Roundy | |
| 2011/0145920 A1 * | 6/2011 | Mahaffey | ............ H04L 63/1416 726/22 |
| 2012/0167218 A1 | 6/2012 | Poornachandran et al. | |
| 2012/0260304 A1 | 10/2012 | Morris et al. | |
| 2013/0232251 A1 * | 9/2013 | Pauley | ................ H04L 43/0876 709/224 |
| 2014/0143875 A1 | 5/2014 | Tikkanen et al. | |
| 2014/0150102 A1 | 5/2014 | Wang et al. | |
| 2015/0082430 A1 * | 3/2015 | Sridhara | ............... G06F 21/566 726/23 |

* cited by examiner

*Primary Examiner* — Nam T Tran
(74) *Attorney, Agent, or Firm* — Noah J. Hayward (57) ABSTRACT

A method executable via operation of configured processing circuitry to identify applications by remote monitoring may include initiating remote communication with a target device through an access point, the access point providing network access to the target device, providing a series of ping messages to the target device via the access point to determine a delay signature of an application running on the target device, and generating application identification information based on the delay signature.

20 Claims, 6 Drawing Sheets

METHOD AND APPARATUS FOR REMOTE APPLICATION MONITORING

CROSS-REFERENCE TO RELATED APPLICATIONS

This application claims priority to and the benefit of U.S. Provisional Application No. 61/899,447, filed on Nov. 4, 2013 and U.S. Provisional Application No. 61/985,131, filed on Apr. 28, 2014, the entire contents of each of which are hereby incorporated herein by reference.

TECHNICAL FIELD

Example embodiments generally relate to techniques for remote monitoring and, in particular, relate to apparatuses (and/or methods executable by configured apparatuses) that are configured for employing the same to remotely detect the applications that are running on a device.

BACKGROUND

Enterprises and other organizations that utilize network communications have long sought to enhance their security management capabilities. In some cases, such organizations may employ so-called "bring your own device" environments in which limited applications are allowed for use on the network. Such environments may allow the enterprise to check for malware using, for example, mobile device managers (MDMs). However, even in these environments, anti-virus security measures can be subverted by malware. Furthermore, MDMs typically require a maintenance intensive program to continuously update and patch software that is installed on every device that is to be monitored.

Accordingly, it may be desirable to generate monitoring methods that avoid the limitations described above.

BRIEF SUMMARY OF SOME EXAMPLES

Some example embodiments may enable the provision of a remote monitoring device that can remotely monitor network-based processes such as particular applications on devices operating in the network. As such, for example, monitoring may be accomplished to infer the types of applications executing on a device (e.g., a mobile device) without any native network traffic being generated from the device. In this regard, for example, some embodiments may enable the provision of a configurable tool for inconspicuously soliciting network traffic from mobile devices by pinging the devices and then, based on device response, classifying and/or identifying the applications being run.

In one example embodiment, an apparatus for identifying applications by remote monitoring is provided. The apparatus may include processing circuitry configured for initiating remote communication with a target device through an access point, the access point providing network access to the target device, providing a series of ping messages to the target device via the access point to determine a delay signature of an application running on the target device, and generating application identification information based on the delay signature.

In another example embodiment, a method executable via operation of configured processing circuitry to identify applications by remote monitoring is provided. The method may include initiating remote communication with a target device through an access point, the access point providing network access to the target device, providing a series of ping messages to the target device via the access point to determine a delay signature of an application running on the target device, and generating application identification information based on the delay signature.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some embodiments of the present invention may relate to the provision of remote monitoring capabilities. As such, some example embodiments may provide a tool for identifying application and/or application type based on delay signatures of various applications without requiring software to be loaded onto the monitored device.

Figure 1:
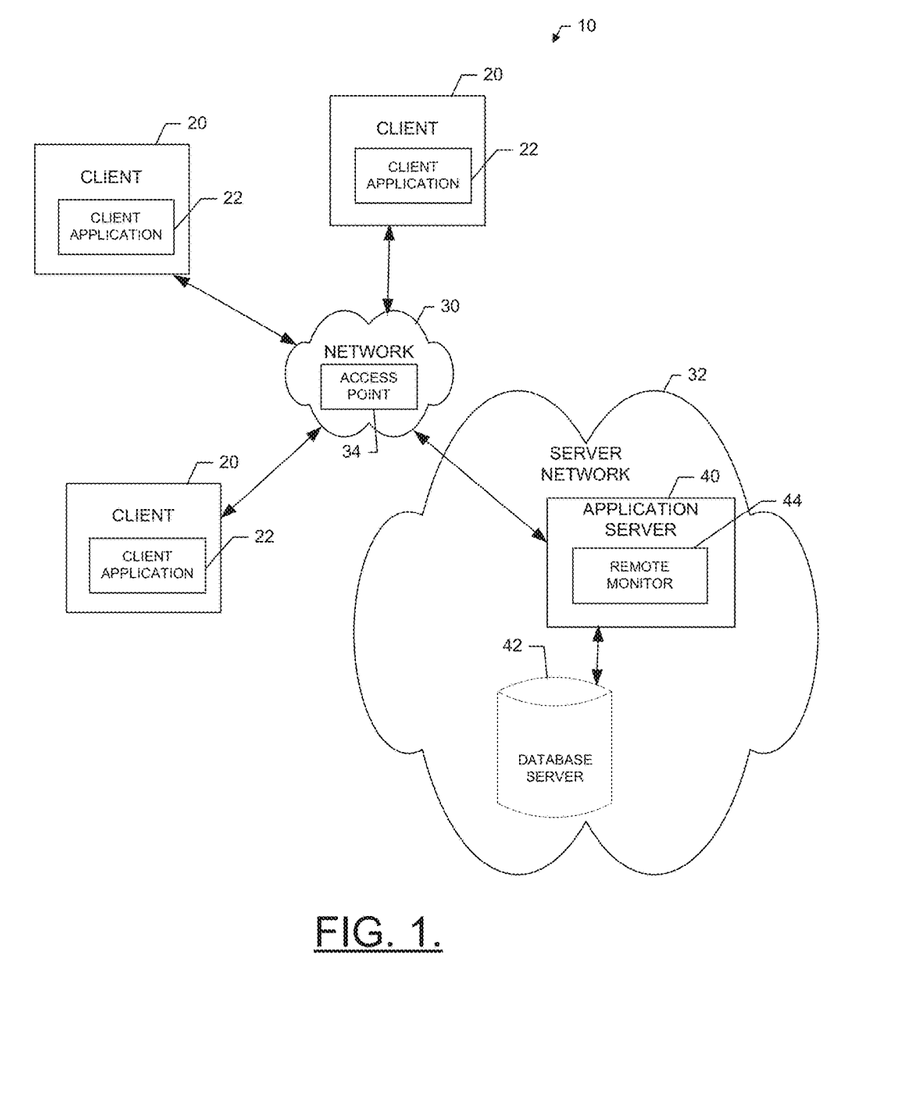
FIG. 1 illustrates a functional block diagram of a system that may be useful in connection with remote monitoring according to an example embodiment.

An example embodiment of the invention will now be described in reference to FIG. 1. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced in connection with a single client connected to the system 10.

The example described herein will be related to an asset comprising a programmed computer or analysis terminal to illustrate one example embodiment. However, it should be appreciated that example embodiments may also apply to any asset including, for example, any programmable device that is capable of interacting with a network access point to monitor the communications between the network access point and various network devices that may execute applications on or in association with the network as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding individuals, locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with or over a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communication characteristics associated therewith relative to the communication that occurs via the network 30 to support execution of the corresponding client application 22. As will be seen below, the distinct communication characteristics may be useful for classifying the client applications 22 via remote monitoring in accordance with an example embodiment.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of certain binary codes associated with software or content being analyzed (e.g., in the database server 42). The information may include a program or series of executable files and/or instructions that are executable by one or more of the clients 20, and for which analysis using a tool of an example embodiment is desired. The application server 40 may host functionality for analyzing the program in accordance with an example embodiment. Alternatively or additionally, the application server 40 may be configured to provide analytical tools for use by the clients 20 to conduct such analysis in accordance with example embodiments.

In some embodiments, for example, the application server 40 may therefore include an instance of remote monitor 44 comprising stored instructions for handling activities associated with practicing example embodiments as described herein. However, it should be appreciated that the remote monitor 44 could be a standalone device in some cases, so it need not be a part of a server or a server network. In some cases, the remote monitor 44 may be employed to monitor the activity of one or more mobile devices (e.g., the clients 20) to determine which applications (e.g., client applications 22) are being executed on the corresponding mobile devices being monitored.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the remote monitor 44 configured to operate in accordance with an example embodiment of the present invention. In this regard, for example, the remote monitor 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access point 34 (e.g., a wireless communication access point) via which the clients 20 may interact with the network 30. As such, the environment of FIG. 1 illustrates an example in which provision of content and information associated with the execution of applications at the clients 20 via, for example, wireless communication of any type (e.g., WiFi, 3G, 4G, LTE, etc.) with the network 30 may be monitored by the remote monitor 44 as described herein.

Figure 2:
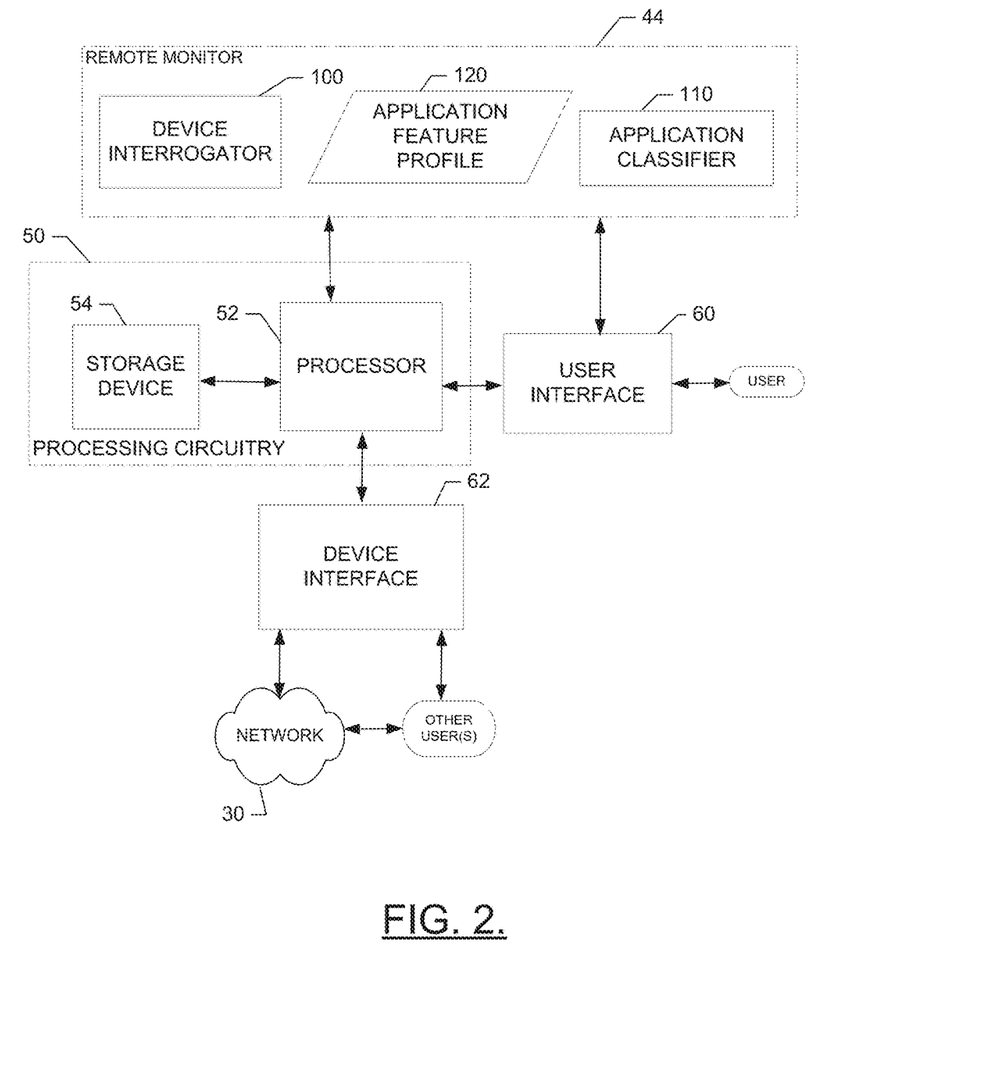
FIG. 2 illustrates a functional block diagram of an apparatus that may be useful in connection with remote monitoring according to an example embodiment.

An example embodiment of the invention will now be described with reference to FIG. 2. FIG. 2 shows certain elements of an apparatus for provision of the remote monitoring described herein according to an example embodiment. The apparatus of FIG. 2 may be employed, for example, on a device such as, for example, a network device, server, proxy, or the like (e.g., the application server 40 of FIG. 1) at which the remote monitor 44 may be instantiated. Alternatively, embodiments may be employed on a combination of devices. Accordingly, some embodiments of the present invention may be embodied wholly at a single device (e.g., the application server 40) or in a distributed environment (e.g., at a plurality of servers of the server network 32. Furthermore, it should be noted that the devices or elements described below may not be mandatory and thus some may be omitted in certain embodiments.

Referring now to FIG. 2, an apparatus for provision of remote monitoring for analyzing software applications run at one or more client devices in accordance with an example embodiment is provided. The apparatus may be an embodiment of the remote monitor 44 or a device hosting the remote monitor 44. As such, configuration of the apparatus as described herein may transform the apparatus into the remote monitor 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device (e.g., at a computer terminal or client device such as one of the clients 20) that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the remote monitor 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the remote monitor 44 as described below.

The remote monitor 44 may be configured to remotely infer information about the application(s) running on one or more devices (e.g., mobile devices such as clients 20). In particular, the remote monitor 44 may be configured to remotely infer the type of application and/or identify the application running on a particular mobile device based on CPU throttling conducted by the mobile device. As such, for example, the remote monitor 44 may interact with the remote device to monitor the performance of the on-demand governor of the device relative to CPU throttling in order to determine which type of application, or application, is being executed. CPU throttling scales the CPU performance of the mobile device (or any other client 20) according to the needs of the presently running application or applications on the device in an effort to save power. By monitoring the CPU throttling activity on the device, embedded delays can be extracted from solicited Internet Control Message Protocol (ICMP) network traffic. This information may be useful in identifying the application for any number of networks and/or devices (e.g., Android devices, Apple devices, and/or the like).

Essentially, the remote monitor 44 may be configured to recognize "application footprints" for various different applications or application types. The remote monitor 44 may be configured to utilize these application footprints as an initial step in white listing or black listing for specific situations where mobile devices produce no network traffic. This may fill a monitoring void that cannot be filled by traditional intrusion detection systems that require natively generated traffic for operation. Example embodiments may therefore enable operation of a remote monitor such that network based monitoring can occur without any software being installed on any of the devices being monitored. In some cases, mobile devices executing applications from multiple vendors may be evaluated to identify specific traits that can be detected for assisting in application identification. Moreover, in some cases, the remote monitor 44 may remotely identify application types on the basis of certain classifications that are determinable based on the impact on the CPUT of the executing device (e.g., CPU intensive, I/O intensive or non-CPU intensive applications).

In an example embodiment, the remote monitor 44 may include a device interrogator 100 and an application classifier 110 to conduct at least some of the operations of the remote monitor 44. As such, for example, the device interrogator 100 and the application classifier 110 may each be components of executable instructions that are executed to configure the remote monitor 44 to perform the corresponding functionality described herein by virtue of the configuration defined for each respective component. For example, the device interrogator 100 may be configured to inconspicuously solicit network traffic from the device being monitored (e.g., one of the clients 20). The solicitation may be generated in the form of a ping. The device interrogator 100 may then capture the timestamp of the ICMP replies from the device being monitored. The application classifier 110 may be configured to employ a machine learning technique that has been previously trained on samples of ICMP replies for one or more known applications. The training on samples of ICMP replies may be an example of employing application fingerprinting to enable application identification (or type classification) to be conducted. The machine learning technique may identify the application by learning features induced into network traffic by the manner and way that the application uses the shared resources (e.g., CPU, memory, and/or the like) within the devices internal architecture. The application fingerprint may therefore be an example of an application feature profile 120. As such, the application classifier 110 may be trained on the application feature profile 120 of one or more applications. The application feature profile 120 may include information indicative of the delay signature induced into the ICMP responses of a mobile device that is using a shared resource (e.g., CPU, memory) and the delay signature may be unique to the application or a type of application. Thus, the device interrogator 100 may solicit the ICMP replies and the application classifier 110 may use the delay signature indicated by the ICMP replies to classify or identify the application that is running on the mobile device (or remote device, such as any one of the clients 20).

Figure 3:
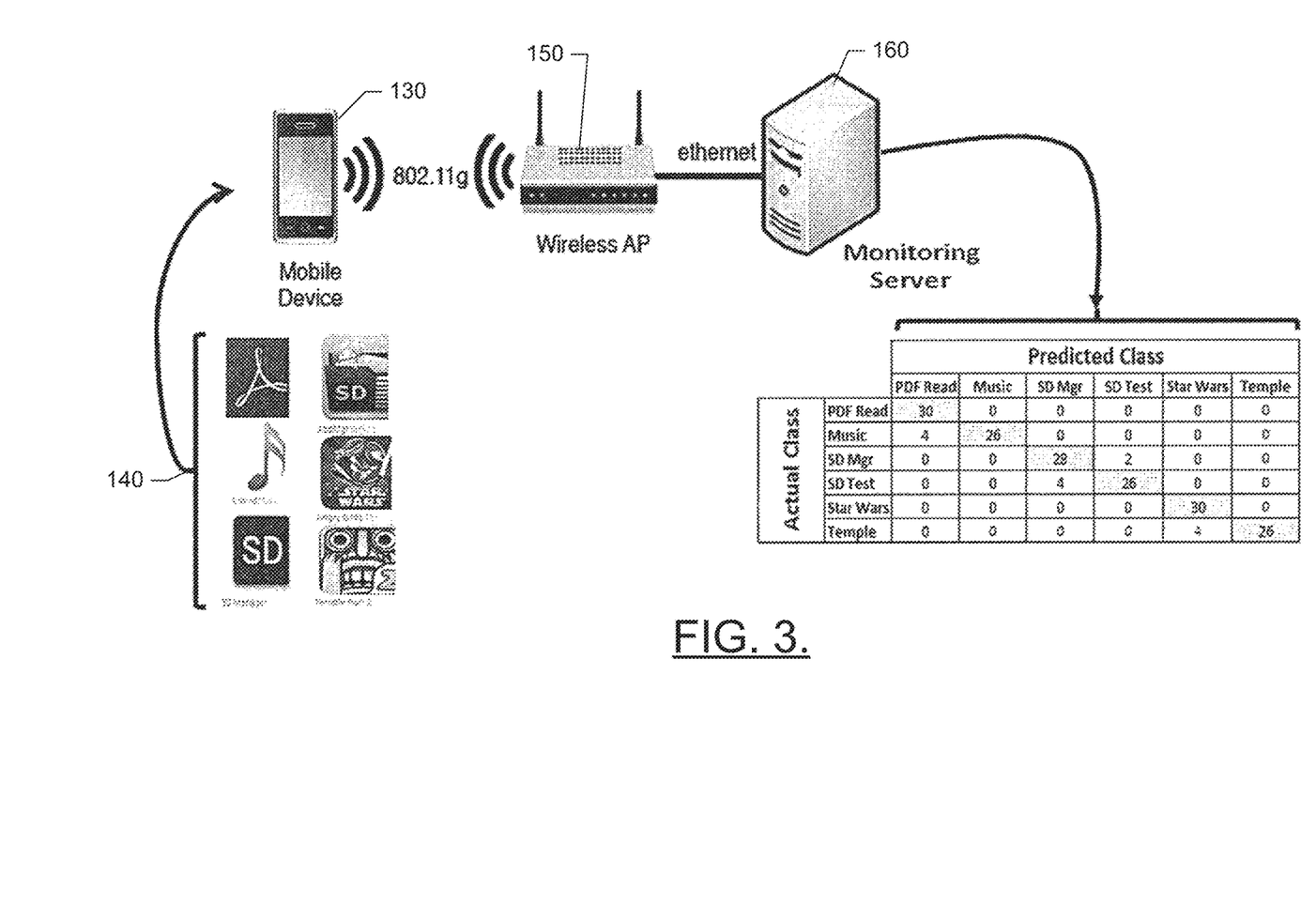
FIG. 3 illustrates an example operating scenario in which a remote monitor may perform an example embodiment.

FIG. 3 illustrates an example operating scenario in which the remote monitor 44 may perform an example embodiment. In this regard, a mobile device 130 may be an example of one of the clients 20. The mobile device 130 may be executing an application 140 that may be an example of client applications 22. A wireless access point 150 may be an example of access point 34. The wireless access point 150 may supply data to the mobile device 130 via a WiFi connection, although other wireless communication protocols may be employed in other embodiments. A monitoring server 160 may be an example of a device at which the remote monitor 44 may be hosted, and the monitoring server 160 may be connected to the wireless access point 150 via an Ethernet connection.

In this example, the remote monitor 44 at the monitoring server 160 may store one or more application feature profiles of application delay signatures. The remote monitor 44 may ping the mobile device 130 and compare the delays associated with the ICMP replies received, using the timestamps of the ICMP replies, with the application delay signatures of the application feature profiles. As an example, the timestamps of the ICMP replies may be collected into an experimental vector and the machine learning technique described above may be employed to determine a percentage of certainty that the ICMP replies correlate to one of the application delay signatures of one of the application feature profiles. Thus, for example, if the mobile device 130 is executing malware that has been identified and has an application feature profile that the application classifier 110 is aware of, the remote monitor 44 may be enabled to detect the situation remotely. In some cases, the operation of the remote monitor 44 may be enhanced when the WiFi or other wireless signal strength is high, when only one application is running and/or when the user is not interacting heavily with the mobile device. However, the remote monitor 44 may still operate in some cases, regardless of signal strength, the number of applications running and the amount of user interaction.

Generally speaking, an application may be categorized by the resource that is its limiting factor. For example, a CPU intensive application may be limited by the speed at which calculations can be completed. I/O intensive applications may be limited by the speed at which data can be transferred to and from the source media (e.g., an SD card). Memory intensive applications may be limited by the amount and speed of memory that is available for a process to use. Accordingly, it may be possible to identify or classify applications as being intensive or non-intensive with respect to the demands that the applications have one the above mentioned resources. However, in a simplified example, a limited set of the classifications may be considered. For example, CPU intensive, non-CPU intensive and I/O intensive may be reduced complexity set of application feature profiles that may be employed in an example embodiment. In such an example, the effects on memory can be ignored and the CPU scheduling impacts associated with I/O intensive and CPU intensive applications can be monitored for via monitoring of CPU throttling as described above. In this regard, for CPU intensive applications, the scheduler will be filled with processes that require CPU time, but for non-CPU intensive applications, very few processes will be waiting for the CPU. In contrast, for I/O intensive applications, delays due to waiting on processes to release I/O resources dominate even CPU throttling when the device has an external (i.e., removable) memory such as an SD card.

In Android systems, as an example, the CPU is controlled to manage power consumption. Thus, for example, if the CPU is doing no work, it should use no power. CPU scaling or throttling is therefore employed as a power saving functionality that lowers power consumption by throttling the CPU relative to needs of the device. The CPU throttling may employ a governor to determine the CPU needs of an application being executed. A driver may then move the current CPU frequency to a desired value to achieve CPU throttling or CPU frequency scaling. In some cases, CPU throttling is based on the needs of the foreground process and all running background processes. The number of processes allowed to execute in the background may depend on the amount of memory that is free on the mobile device, and the order in which processes are killed to free up memory may depend on the relative priority of the processes. The default governor, which may be an on-demand governor, may employ a number or variables to support its operation. As an example, the maximum CPU speed may be stored as a variable called $CPU_{max}$. The minimum allowed CPU speed may be stored as a variable called $CPU_{min}$. Another variable called up_threshold may define the maximum CPU load percentage allowable before the governor scales the CPU load up to the next level. The sampling_rate variable may define the rate at which the governor samples the present CPU load. These variables may be used by the on-demand governor to manage CPU speed such that the impact to the power source is minimized. Specifically, the on-demand governor may keep CPU speed at $CPU_{min}$ when the mobile device is not executing any user-space applications, and as soon as the smallest user-space application is run, it may immediately force the CPU speed to $CPU_{max}$ and immediately start to drop CPU speed until just before up_threshold CPU load is exceeded. In other words, the on-demand governor may scale the current CPU speed such that the up_threshold CPU load for the current CPU speed is never exceeded. This occurs until $CPU_{max}$ is reached. Accordingly, CPU speed for CPU intensive applications and non-CPU intensive applications may be defined as follows:

$$CPU\ Intensive >= (up\_threshold) \times (CPU_{max})$$

Non-CPU Intensive < CPU Intensive.

In some operating systems, when the mobile device receives an ICMP request, an interrupt is created, and the process that has access to the CPU is preempted, its context is stored, and the interrupt is handled. Then, the ICMP requests are responded to with ICMP replies by kernel-space assembly language subroutines. Finally, these subroutines may be processed faster or slower based on the speed at which the CPU is running when while handling the preempted process. The mobile device's current CPU speed affects the inter-packet spacing (IPS) of network traffic emitted (i.e., ICMP replies) from the mobile device while CPU intensive or non-CPU intensive applications are executing on the mobile device. When I/O intensive applications are executing on the mobile device, the processes of the mobile device may be enabled to delay the kernel-space generated ICMP replies. This delay may result from the time it takes to preempt I/O processes that have use of the CPU and are accessing the SD card. Empirical data supports this theory. Specifically, the IPS of ICMP replies emitted from a mobile device running a non-CPU intensive application is much larger than the IPS of ICMP replies from the same device running a CPU intensive application. Further, the IPS of ICMP replies emitted from a device running an I/O intensive application may be even larger than the IPS of ICMP replies from the same device running a non-CPU intensive application if the I/O processes access an external SD card. Because of this observable behavior, remote identification of the applications running on the mobile device may be accomplished based on these differences in IPS. Accordingly, remote determination of the processes executed on a device (e.g., a mobile device) may be accomplished when no native traffic is being generated.

In some cases, the operation of example embodiments could be slightly different based on the mode of operation of the device that is being remotely monitored. For example, in a simple case where there are a limited number of modes of operation, an idle mode may be a mode in which the display may be either on or off and the CPU is running at $CPU_{min}$. A user interaction mode would require the display to be on and CPU speed may be greater than $CPU_{min}$, but less than or equal to $CPU_{max}$. In an active mode, the display may be on or off and CPU speed may again be greater than $CPU_{min}$, but less than or equal to $CPU_{max}$. In each mode, the wireless adapter of the device may be turned on. When in the user interaction mode, the user's interaction with the screen typically results in noticeable spikes in CPU speed. However, if the application is a CPU intensive application, then the CPU speed will remain high. In each of these modes, a different threshold for distinguishing between, for example, CPU intensive and non-CPU intensive applications may be defined for comparison to IPS of ICMP replies.

Figure 4:
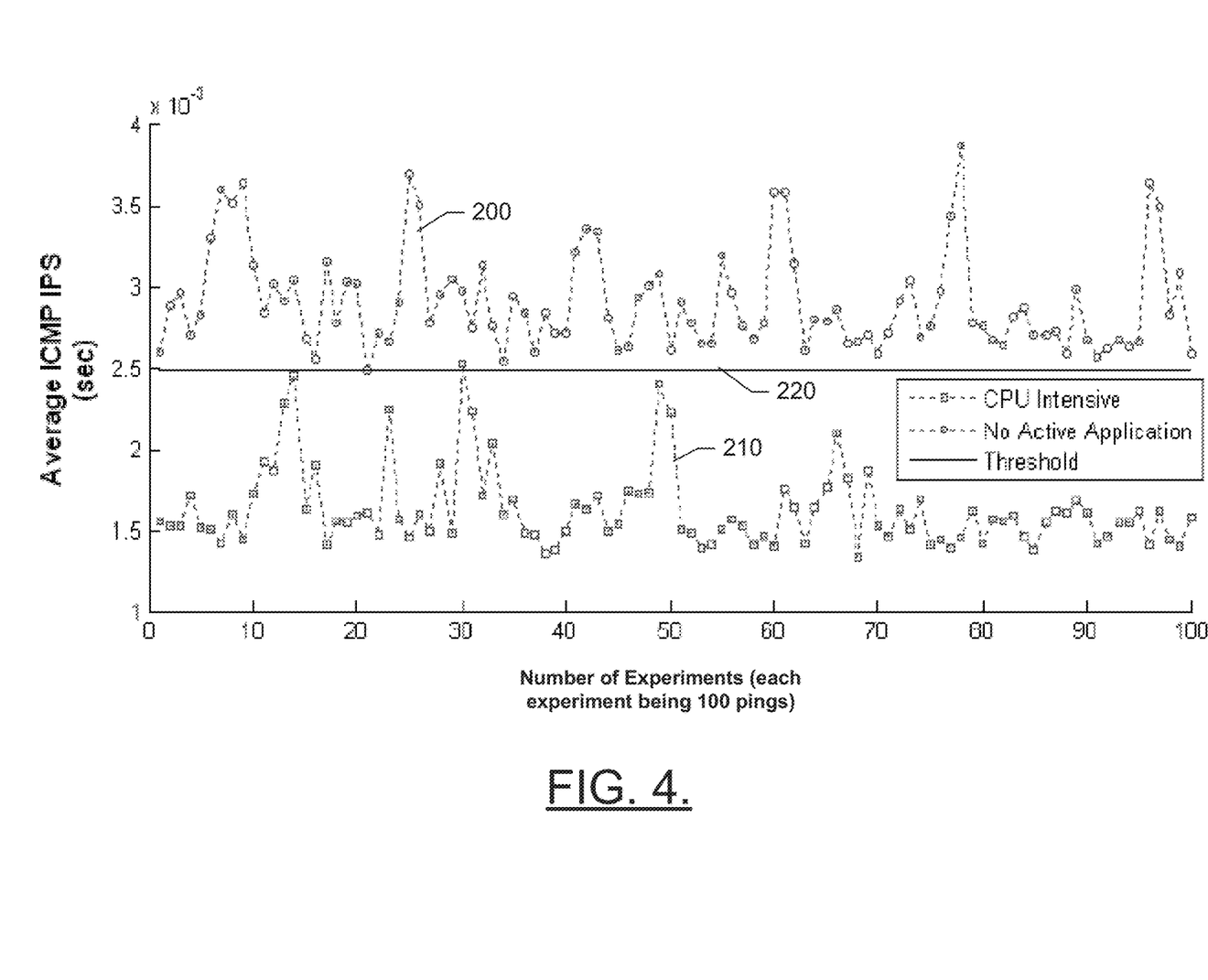
FIG. 4 illustrates a chart showing average IPS for ICMP replies of a CPU intensive application and average IPS for ICMP replies of a non-CPU intensive application relative to a threshold according to an example embodiment.
Figure 5:
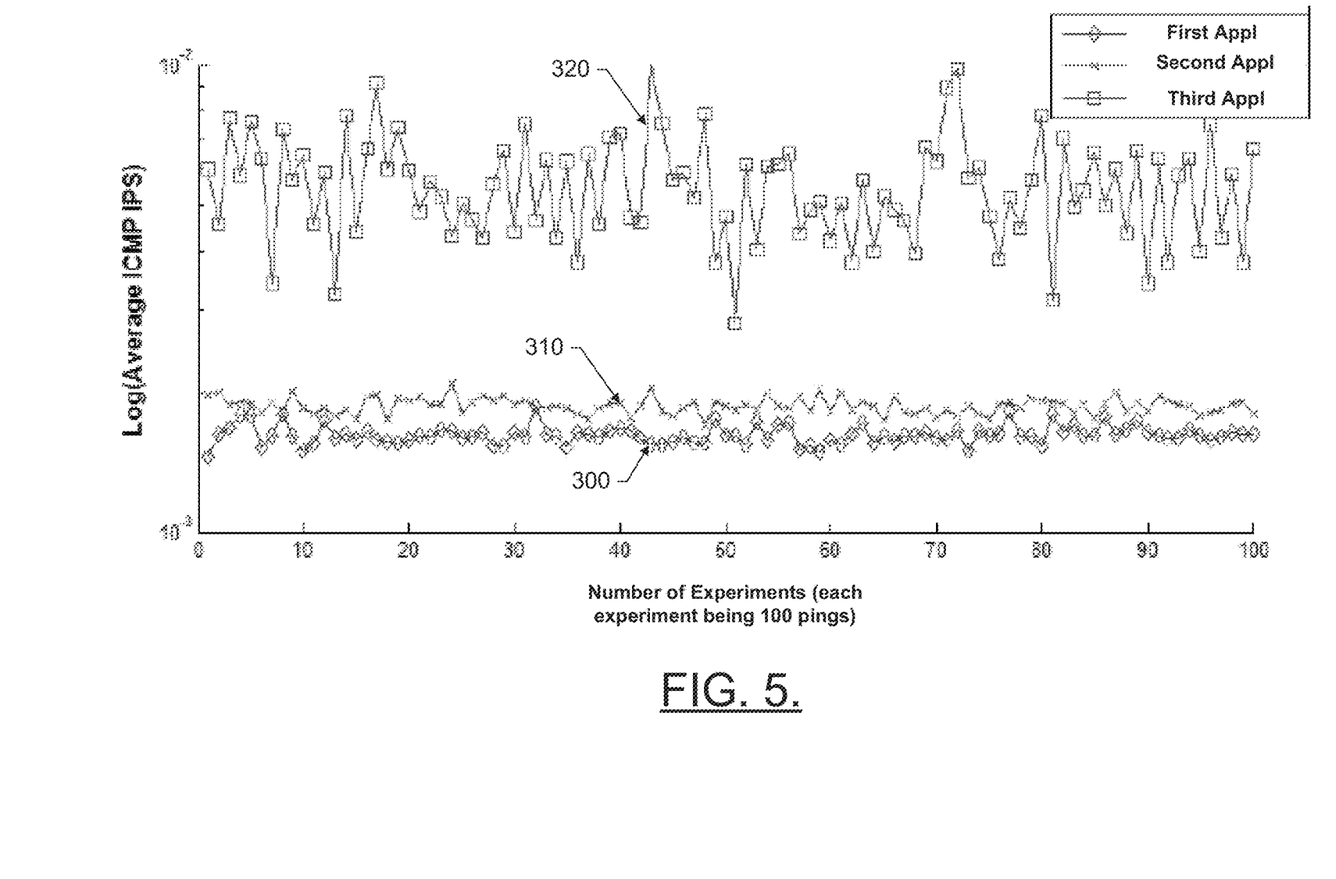
FIG. 5 illustrates an example of three different applications and their corresponding average IPS for ICMP replies.

FIG. 4 illustrates an example of average IPS for ICMP replies of a CPU intensive application 200 and average IPS for ICMP replies of a non-CPU intensive application 210 relative to a threshold 220 for an Android device. In the example, a standard ping application (i.e., ping −I 0.1 <ipaddress>) was used to induce network packets in the form of ICMP replies. The timestamps of the ICMP replies were then collected as described above to determine the average IPS. In this example, 100 pings were issued from the remote monitor 44 and the average IPS was calculated based on the replies to these 100 pings. As can be appreciated from this example, it is possible to clearly distinguish the classes of applications based on the average IPS data, thereby enabling the remote device 44 to classify the running applications as CPU intensive or non-CPU intensive. However, using a profile of the IPS for ICMP replies (e.g., the application feature profile 120 having information indicative of the delay signature), it may be further possible to identify the specific application. FIG. 5 illustrates an example of three different applications and their corresponding average IPS for ICMP replies. A first application 300, a second application 310 and a third application 320 each have distinctively different curves defining their average IPS for ICMP replies. A Neural-Fuzzy Classifier (NFC) may be employed (e.g., as an example of the application classifier 110) to create fuzzy membership functions that bind training sets such that the root mean squared error (RMSE) of the correctly classified training patterns is a minimum for a given application. Then the NFC can be used to identify applications on which it has been trained. Thus, for example, the NFC may be trained on a plurality of application feature profiles. The NFC may be configured to group training patterns into clusters to create membership functions to separate applications by type, thereby acting as a dynamic threshold for separating applications by type.

Figure 6:
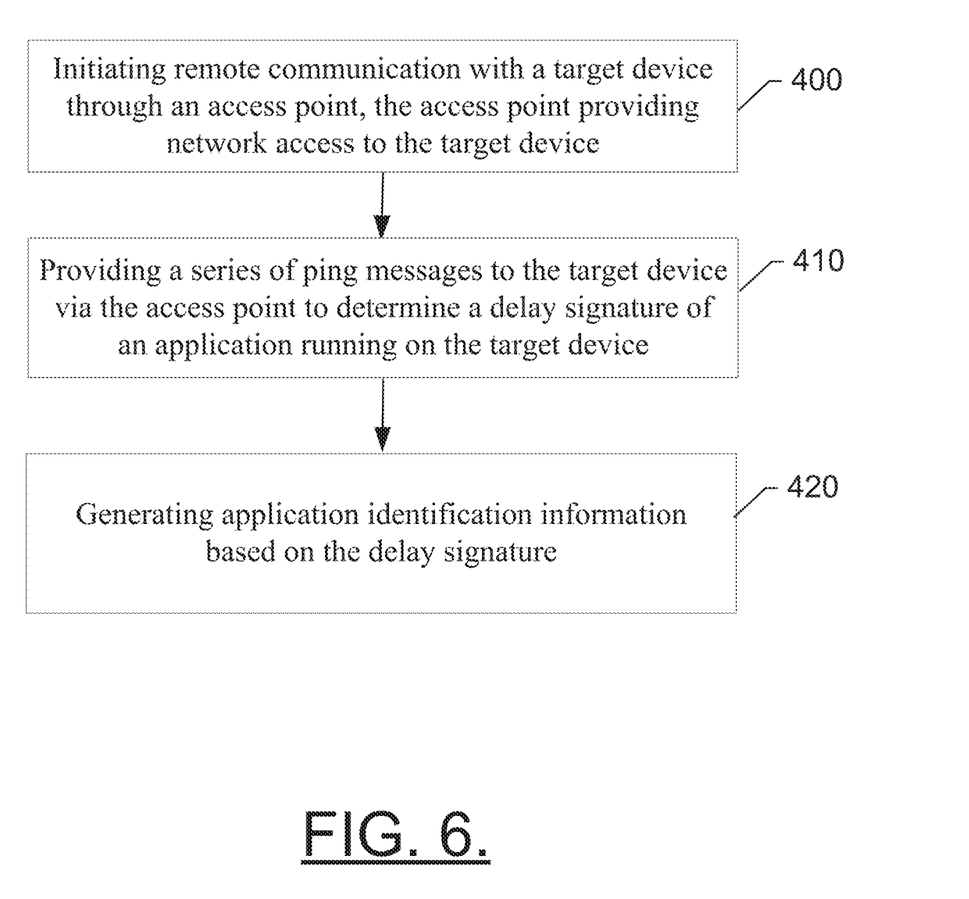
FIG. 6 illustrates a method for identifying an application remotely according to an example embodiment.

From a technical perspective, the remote monitor 44 described above may be used to support some or all of the operations described above. As such, the platform described in FIGS. 1-2 may be used to facilitate the implementation of several computer program and/or network communication based interactions. As an example, FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include initiating remote communication with a target device (e.g., a mobile device or client 20) through an access point (e.g., a wireless access point) at operation 400. The access point may provide network access to the target device. The method may further include providing a series of ping messages to the target device via the access point to determine a delay signature of an application running on the target device at operation 410 and generating application identification information based on the delay signature at operation 420.

In an example embodiment, an apparatus for performing the method of FIG. 6 above may comprise a processor (e.g., the processor 52) or processing circuitry configured to perform some or each of the operations (400-420) described above. The processor may, for example, be configured to perform the operations (400-420) by performing hardware implemented logical functions, executing stored instructions, or executing algorithms for performing each of the operations. In some embodiments, the processor or processing circuitry may be further configured for additional operations or optional modifications to operations 400 to 420. In this regard, for example, determining the delay signature may include determining an average inter-packet spacing for Internet Control Message Protocol (ICMP) replies to the ping messages. In some cases, determining the average inter-packet spacing for the ICMP replies may include capturing timestamp information from each ICMP reply to determine the average inter-packet spacing. In some examples, generating application identification information based on the delay signature may include classifying the application as intensive or non-intensive relative to a limiting resource of the target device. In an example embodiment, classifying the application may include classifying the application relative to intensive or non-intensive consumption of central processing unit (CPU), memory, or input/output (I/O) resources. In some cases, classifying the application may include classifying the application relative to a threshold. In some embodiments, generating application identification information based on the delay signature comprises may include the delay signature to a plurality of application feature profiles to determine a certainty rating relative to the application matching one of the application feature profiles. In some examples, generating application identification information based on the delay signature may include utilizing a Neural-Fuzzy Classifier trained on a plurality of application feature profiles, the Neural-Fuzzy Classifier grouping training patterns into clusters to create membership functions to separate applications by type. In an example embodiment, generating application identification information based on the delay signature may include generating the application identification information without any native network traffic being generated from the target device and without any monitoring software being installed on the target device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing description and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus comprising processing circuitry configured to execute instructions for:
    initiating remote communication with a target device through an access point of a communication network, the access point providing network access to the target device;
    providing a series of ping messages to the target device via the access point;
    determining a delay signature of the target device based on Internet Control Message Protocol (ICMP) replies to the ping messages; and
    determining which learned application of a plurality of learned applications is running on the target device based on a comparison of the delay signature with a plurality of learned application delay signatures, wherein each learned application delay signature is associated with a respective learned application, and each learned application delay signature is defined based on training performed using training ICMP replies from a training device that is running the respective learned application.

2. The apparatus of claim 1, wherein the access point is a wireless access point and the target device is a mobile device.

3. The apparatus of claim 1, wherein the processing circuitry is further configured to execute instructions for determining an average inter-packet spacing for the ICMP replies and capturing timestamp information from each ICMP reply to determine the average inter-packet spacing.

4. The apparatus of claim 1, wherein the processing circuitry is further configured to execute instructions for generating application identification information based on the delay signature and classifying the application as intensive or non-intensive relative to a limiting resource of the target device.

5. The apparatus of claim 4, wherein classifying the application comprises classifying the application relative to intensive or non-intensive consumption of central processing unit (CPU), memory, or input/output (I/O) resources.

6. The apparatus of claim 4, wherein classifying the application comprises classifying the application relative to a threshold.

7. The apparatus of claim 1, wherein the processing circuitry is further configured to execute instructions for generating application identification information based on the delay signature and comparing the delay signature to a plurality of application feature profiles to determine a certainty rating relative to the application matching one of the application feature profiles.

8. The apparatus of claim 1, wherein the processing circuitry is further configured to execute instructions for generating application identification information based on the delay signature and utilizing a Neural-Fuzzy Classifier trained on a plurality of application feature profiles, the Neural-Fuzzy Classifier grouping training patterns into clusters to create membership functions to separate applications by type.

9. The apparatus of claim 1, wherein the processing circuitry is further configured to execute instructions for generating application identification information based on the delay signature without any native network traffic being generated from the target device and without any monitoring software being installed on the target device.

10. The apparatus of claim 1, wherein shared resources of the target device used in the determining which learned application of a plurality of learned applications is running on the target device comprise central processing unit (CPU) resources, memory resources, and input/output (I/O) resources.

11. A method executable via operation of configured processing circuitry, the method comprising:
    initiating remote communication with a target device through an access point of a communication network, the access point providing network access to the target device;
    providing a series of ping messages to the target device via the access point;
    determining a delay signature of the target device based on Internet Control Message Protocol (ICMP) replies to the ping messages; and
    determining which learned application of a plurality of learned applications is running on the target device based on a comparison of the delay signature with a plurality of learned application delay signatures, wherein each learned application delay signature is associated with a respective learned application, and each learned application delay signature is defined based on training performed using training ICMP replies from a training device that is running the respective learned application.

12. The method of claim 11, wherein the access point is a wireless access point and the target device is a mobile device.

13. The method of claim 11, further comprising determining an average inter-packet spacing for the ICMP replies and capturing timestamp information from each ICMP reply to determine the average inter-packet spacing.

14. The method of claim 11, further comprising generating application identification information based on the delay signature and classifying the application as intensive or non-intensive relative to a limiting resource of the target device.

15. The method of claim 14, wherein classifying the application comprises classifying the application relative to intensive or non-intensive consumption of central processing unit (CPU), memory, or input/output (I/O) resources, wherein classifying the application further comprises determining whether the application utilizes I/O resources to access an external, removable memory card.

16. The method of claim 14, wherein classifying the application comprises classifying the application relative to a threshold.

17. The method of claim 11, further comprising generating application identification information based on the delay signature and comparing the delay signature to a plurality of application feature profiles to determine a certainty rating relative to the application matching one of the application feature profiles.

18. The method of claim 11, further comprising generating application identification information based on the delay signature and utilizing a Neural-Fuzzy Classifier trained on a plurality of application feature profiles, the Neural-Fuzzy Classifier grouping training patterns into clusters to create membership functions to separate applications by type.

19. The method of claim 11, further comprising generating application identification information based on the delay signature without any native network traffic being generated from the target device and without any monitoring software being installed on the target device.

20. The method of claim 11, wherein shared resources of the target device used in the determining which learned application of a plurality of learned applications is running on the target device comprise central processing unit (CPU) resources, memory resources, and input/output (I/O) resources.

* * * * *